July 15, 1969   G. HAMMERLING   3,455,576
MEANS FOR PREVENTING UNAUTHORIZED CASHING OF CHECKS
Filed July 11, 1967

INVENTOR:
GOLDIE HAMMERLING
BY
Breitenfeld & Levine
ATTORNEYS

United States Patent Office 3,455,576
Patented July 15, 1969

3,455,576
MEANS FOR PREVENTING UNAUTHORIZED CASHING OF CHECKS
Goldie Hammerling, Elmont, N.Y., assignor of one-half to Charles D. Porter, New York, N.Y.
Filed July 11, 1967, Ser. No. 652,612
Int. Cl. B42d 15/00
U.S. Cl. 283—7      3 Claims

ABSTRACT OF THE DISCLOSURE

A check bears a particular marking, such as a certain color. Payee is in possession of a label having a matching marking. The label may also bear facsimile signature of payee. Regions provided on back of check to which label must be attached, and in which check must be endorsed, before check can be negotiated. In a series of such checks, the markings of the checks are different, and payee has a series of labels each of which bears a marking matching one of the checks.

---

This invention relates to checks used to make payments of money, and more particularly to checks issued, usually on a regular basis, to payees whose identity is known in advance.

Examples of the type of checks with which the invention is concerned are those issued to senior citizens by the Social Security Administration, and those issued to relief clients by government welfare agencies. Certain problems have arisen in connection with this type of check. For example, if such a check is lost by, or stolen from, the recipient, the issuing agency usually replaces it although the original check may be surreptitiously cashed by the finder, or thief. Furthermore, dishonest recipients of such checks have been known to feign loss of a check and obtain a replacement, and then have an accomplice cash one of the checks.

It is therefore an object of the present invention to provide an arrangement for preventing a check being cashed by other than the payee, and for preventing a payee from cashing, either personally or through an accomplice, more than one check for any particular payment period.

To achieve this and other objectives, the invention contemplates the use of a series of checks having markings which differ from one another. Thus, for example, each check in the series may have a color different from all the other checks in the series. If the checks in question are issued once a month to each recipient, a series of checks may be considered the number of checks supplied annually, i.e., twelve checks. Prior to the time a check is issued, the issuing agency supplies the recipient with a label carrying a marking, e.g., color, matching the marking on the check to be issued. In addition, the check bears instructions on it requiring that, in addition to endorsement, the label must be affixed to the check before it can be negotiated. Thus, only the person in possession of the label can cash the check, and of course only one corresponding label is supplied for each check issued. If desired, a complete series of labels may be supplied to the recipient at one time, the appropriate label being employed as each check is received.

A feature of the invention involves the appearance of a facsimile signature of the payee on each label. This furnishes added assurance that only the payee will cash the check, since the endorsement on the check must obviously match the fascimile signature of the label secured to the check.

Additional advantages and features of the invention will be apparent from the following description in which reference is made to the accompanying drawings.

Figure 1:
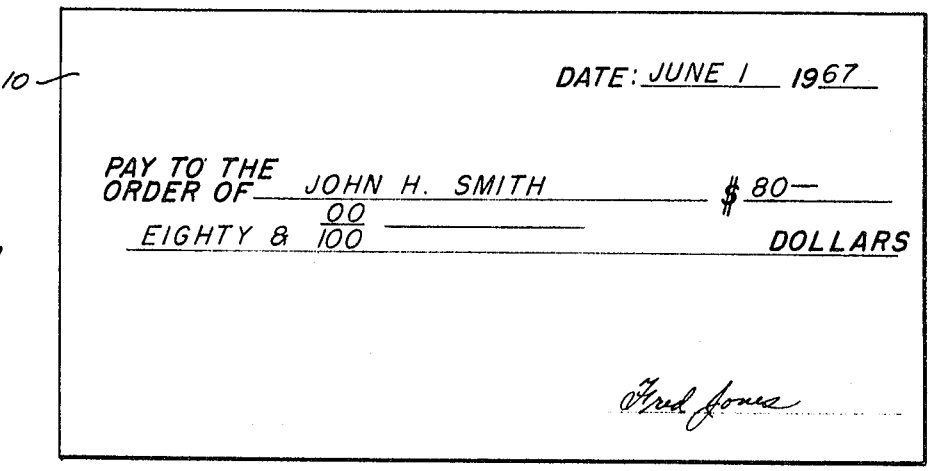
Figure 2:
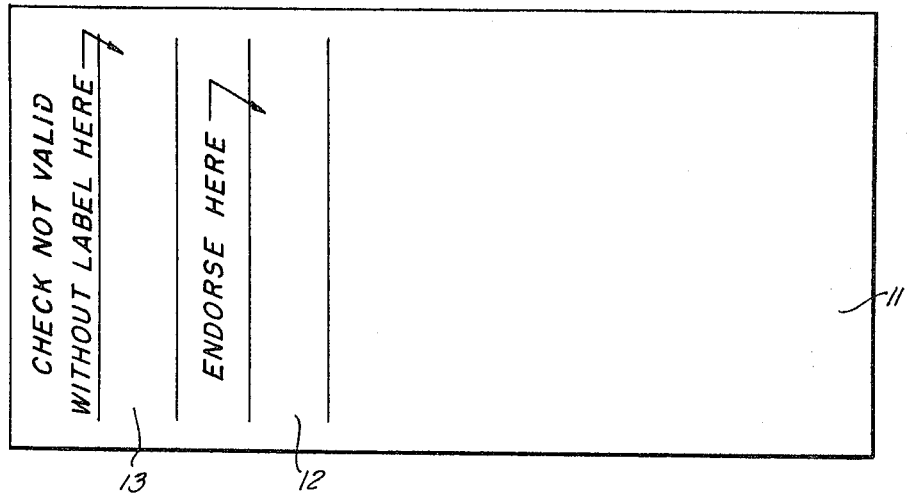

In the drawings:
FIG. 1 shows the front face of a check;
FIG. 2 shows the rear face of the same check according to this invention; and
FIG. 3 shows a number of labels according to this invention.

The face 10 of the check shown in FIG. 1 may be entirely conventional in every respect. The check bears the name of a payee, and is dated "June 1, 1967." If the check is assumed to be one of a series of checks issued monthly, the neck check in the series (not shown) would be dated "July 1, 1967." Furthermore, the check has a special predetermined marking, which in the present illustration will be considered to be a particular color. This color differs from the color of every other check in the series. Consequently, in the present example, each month's check would be of a different color.

The reverse side 11 of the check, shown in FIG. 2, carries instructions to endorse the check in the region 12. The check side 11 also bears a warning that the check may not be negotiated unless a label is affixed to it in the region 13.

Figure 3:
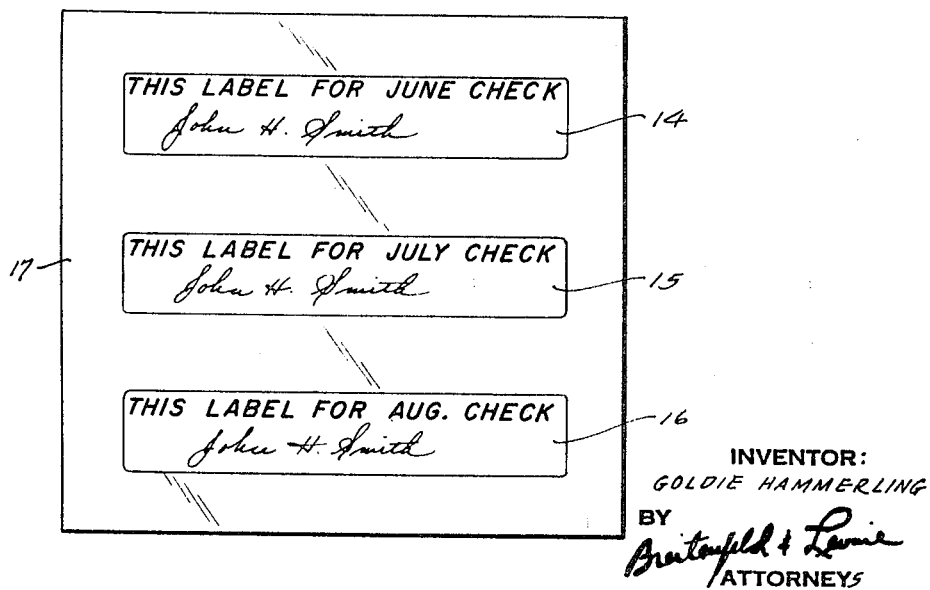

Three labels 14, 15, and 16, of the type referred to are illustrated in FIG. 3. In the present example, each label carries a pressure sensitive adhesive on its rear face, and the labels are supplied secured to a backing sheet 17 from which they can be removed without destroying the adhesive coating on the labels. The label 14 is intended for use with the check of FIGS. 1 and 2, and hence has the same color as this check. The labels 15 and 16 are intended for use with the checks to be issued during the following two months. Consequently, these labels are of colors different from each other and from label 14, the color of each label corresponding to the color of the check with which it will be used.

Advantageously, each label 14–16 bears a facsimile of the signature of the payee, a specimen of the signature having been given to the check-issuing agency in advance.

In practice, when the check of FIGS. 1 and 2 is received, and the recipient wishes to negotiate it, he removes the label 14 from the backing sheet 17, applies it by means of the pressure sensitive adhesive on the label back to the region 13 of the check back 11, and endorses the check back in region 12. It will be appreciated that use of the labels 14–16 affords protection is several ways. First, since the check cannot be negotiated unless its corresponding label is affixed to it, one who finds or steals the check cannot cash it. Second, since the check recipient possesses only one label for each check issued covering any given time period, he can only cash one check for that time period. Third, if the label bears a facsimile of the payee's signature, the danger of someone other than the payee cashing the check is minimized since the endorsement in region 12 must match the facsimile signature on the label in region 13.

Although in the present example the marking of the checks has been referred to as their color, the marking employed may be a pattern of markings, such as a checkerboard design, the markings or the pattern varying from check to check.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:
1. In combination, a series of checks for issuance at intervals to a single payee, each of said checks bearing a marking different from the markings on all the other checks of the series, a series of labels for issuance separately from said checks, each label bearing a marking matching the marking on one of said checks, the marking on each label being different from the markings on all the other labels of the series, means for affixing each label to its corresponding check, and each check having a region to which its corresponding label must be secured before said check is negoitated.

2. A combination as defined in claim 1 wherein said markings are different colors.

3. A combination as defined in claim 1 wherein each label bears a facsimile of the signature of the check payee.

References Cited
UNITED STATES PATENTS

| | | | |
|---|---|---|---|
| 119,715 | 10/1871 | Pardy | 283—58 |
| 493,223 | 3/1893 | Schafer | 283—7 |
| 1,112,654 | 10/1914 | Pfleidered | 283—58 |
| 2,568,427 | 9/1951 | Wolowitz | 253—7 X |

LAWRENCE CHARLES, Primary Examiner

U.S. Cl. X.R.

283—58